(No Model.) 2 Sheets—Sheet 1.
J. C. REILLY.
ELECTRICAL SUBWAY.

No. 447,350. Patented Mar. 3, 1891.

Witnesses
Geo. W. Breck.
Charles R. Truex

Inventor
John C. Reilly
By his Attorney Wm. B. Vansize (No Model.) 2 Sheets—Sheet 2.

J. C. REILLY.
ELECTRICAL SUBWAY.

No. 447,350. Patented Mar. 3, 1891.

Witnesses
Geo. W. Breck
Henry W. Lloyd

Inventor
John C. Reilly
By his Attorney

UNITED STATES PATENT OFFICE.

JOHN C. REILLY, OF BROOKLYN, NEW YORK.

ELECTRICAL SUBWAY.

SPECIFICATION forming part of Letters Patent No. 447,350, dated March 3, 1891.

Application filed May 20, 1890. Serial No. 352,471. (No model.)

*To all whom it may concern:*

Be it known that I, JOHN C. REILLY, a citizen of the United States, and a resident of Brooklyn, in the county of Kings and State of New York, have invented certain new and useful Improvements in Electrical Subways, of which the following is a specification.

My invention is an improvement in electrical subways.

It more particularly relates to means for distributing the conductors from the subway to way-stations and embraces a leading-in device and several details of improvement.

My subway is composed of one or more ducts, and within one or more ducts I place an improved leading-in device consisting of a longitudinally-slotted tube or duct fixed to the interior wall of the main duct or passage. I place a chain within this interior duct having a link composed of a metal plate, said plate being preferably slightly greater in width than the diameter of the tube, so that one edge projects from the tube or duct through the longitudinal slot, its edge being perforated to receive the conductor, which is to be drawn into position within the larger or exterior duct, but outside of the smaller or leading-in duct.

I place my subway at or near the middle of the street or thoroughfare, and I place one duct containing a leading-in duct, arranged as described, within the line of the curb on one or both sides of the street, said duct beginning at a man-hole located at the intersection of a cross-street and terminating at a man-hole located at the intersection of another cross-street, so that wires or conductors may be led off at either man-hole and drawn through the duct which is laid within the curb-line to the point directly in front of the way-station or point of consumption to be supplied. The duct located within the curb-line is provided with a series of couplings, one for each building-lot in the block. Each coupling is tapped and plugged, so that in order to furnish any house with an electrical conductor you have only to remove the plug and screw a small pipe or conduit into position leading into the house or way-station.

The accompanying drawings illustrates my invention.

Figure 1:
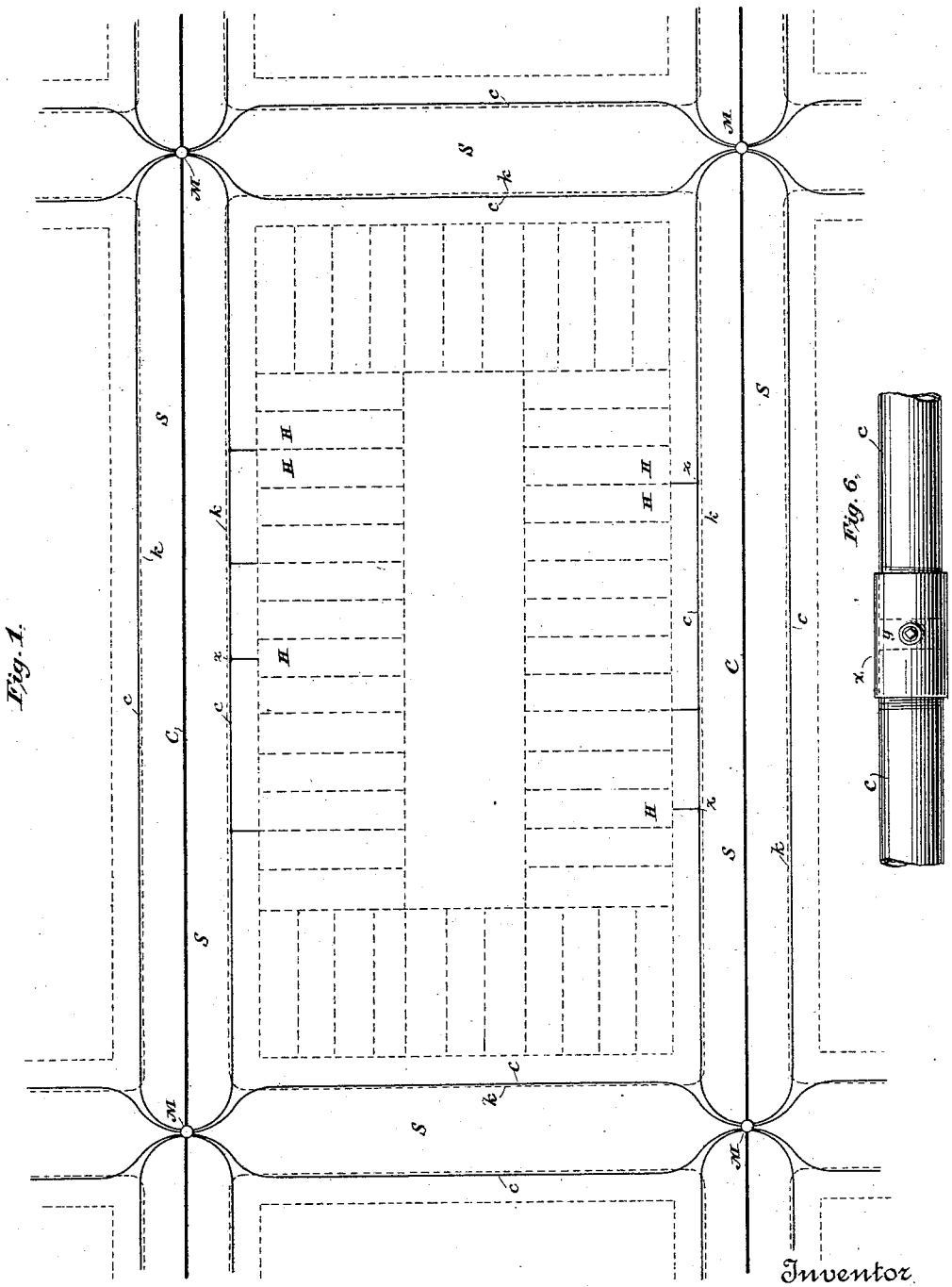
Figure 2:
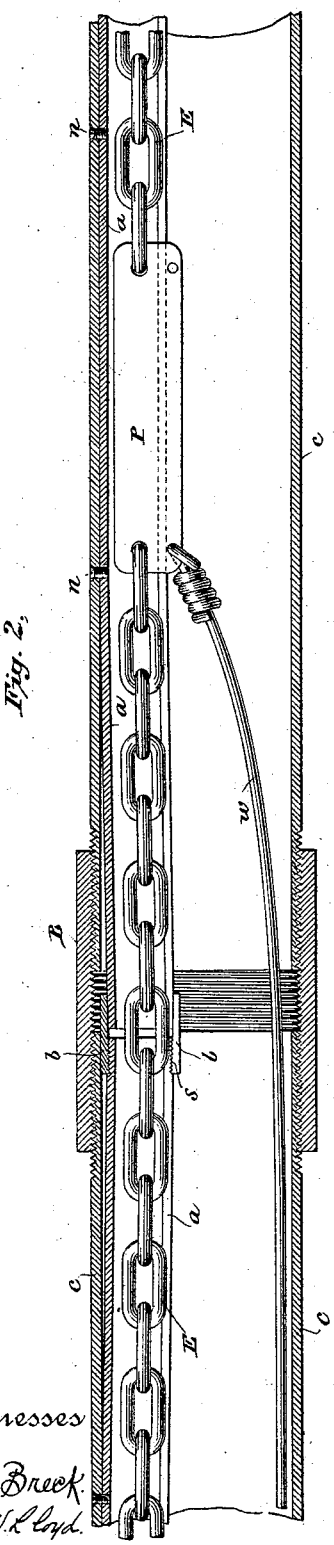
Figure 5:
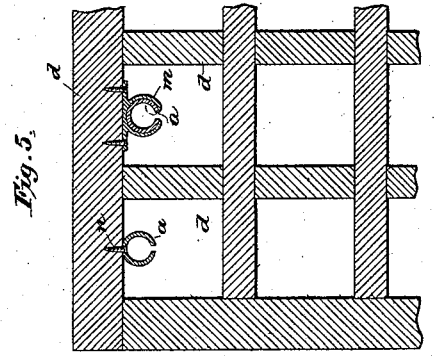
Figure 3:
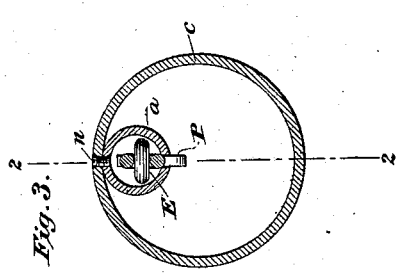

Figure 1 shows a city block, the main conduit being laid at or near the center of intersecting streets, man-holes at these intersections, and a distributing-duct laid within the curb-line connecting man-holes. Fig. 2 shows a longitudinal cross-section of the distributing-duct, the internal leading-in duct, and the chain for leading in. Fig. 3 is a cross-section of the same parts, and Figs. 4 and 5 are cross-sections of different constructions of subways to which my leading-in duct is applied.

Referring to Fig. 1, S are four intersecting streets. There are man-holes M at each street intersection. C is the main conduit. $k$ is the curb, located at the edge of the roadway. $c$ is the distributing-duct laid within the curb-line and connecting adjacent man-holes.

The distributing-duct $c$ is shown in Fig. 2. It is composed of a duct or pipe $c$ and an interior slotted pipe $a$, fixed to the interior wall of the duct $c$ by screws $n$ or in some other suitable way. There is a coupling B, having a thread for uniting sections of the pipe or duct $c$, and a coupling $b$ for the interior duct $a$, having a screw-thread $s$ in one end and a sliding junction in the other. This coupling $b$ would be screwed onto one end of the section of pipe $a$, and when two sections of pipe $c$ are united by the coupling B the end of the adjacent section of tube $a$ would slide into position in $s$, the slot in $a$ being caused to align throughout its length. For the purpose of drawing conductors like $w$ into position in the duct $c$ there is provided a chain E, including in its length a plate of metal P, the width of said plate being somewhat greater than the diameter of the tube $a$, so that the edge of plate P projects through the slot in the tube $a$. The links of chain E should be constructed in such a manner as to prevent their entering the slot. This may be done by imparting a twist to the links or by constructing the chain of links having too great dimensions to enter the slot. This idea is clearly shown in Fig. 3.

Figure 4:
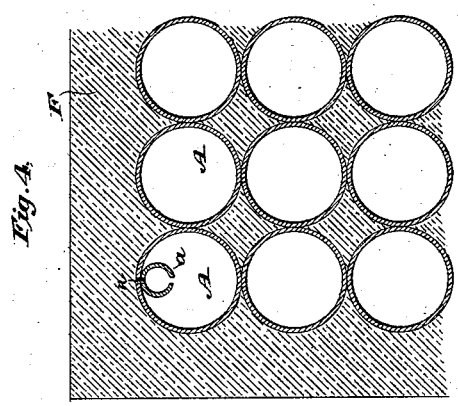

Fig. 4 shows a subway constructed of cement F, embedding a series of iron ducts A. One of these ducts is set apart for use as a distributing-duct and has the internal tube $a$ slotted and fastened to its interior wall by a screw $n$.

In Fig. 5 there is shown the application of my improvement to a subway composed of creosoted wooden boards *d*. Two ducts are here devoted to distributing purposes. Each contains a drawing-in arrangement, as described, the duct or tube *a* being in one case fixed to the interior wall by screws *n* and in the other by a bracket *m*, which is screwed to the wall.

Fig. 6 illustrates the coupling *x*, which is placed in the duct *c* when laid inside the curb-line. It is tapped and plugged, as at *y*, so that all that is required to lead out an electrical conductor is to remove the plug and screw a pipe large enough to carry one or two insulated conductors into its place.

In practically operating my subway I lay the subway and distributing-ducts as shown in Fig. 1. We will assume that the main subway in the middle of the street contains electrical conductors, and that it is desired to supply the house H at the center of the block with electrical service—say telephone-wires. The duct *c* within the curb-line contains a leading-in apparatus, as shown in Fig. 2. We go to the man-hole at either end of the block, cut the conductor to be connected in, connect one or two lengths of insulated wire, like *w*, to the conductor in the main subway, and attach its free end or ends to plate P, forming part of chain E, which is in the slotted leading-in tube *a*, fixed to the interior of the duct *c*, and then pull the chain along from the distant man-hole until the plate bearing the end of the conductor reaches the point at H where it is to be led out. A small pipe is there screwed into position in the coupling *x* and the wire is led through it to the interior of the house H. If there are additional conductors to be drawn in, the chain is drawn back and the operation repeated. So, too, where a subway is established and operating additional conductors may be added by arranging the drawing-in apparatus as shown in Figs. 4 and 5.

What I claim, and desire to secure by Letters Patent, is—

1. In an electrical subway, the combination of a duct or passage consisting of a metal pipe for the reception of insulated conductors, a second duct or passage consisting of a metal pipe fixed to the upper interior surface of the first-named duct, a longitudinal slot in the lower side of the second duct, a plate or link traveling in said slot, to which a cable or conductor may be attached, and a suitable device located in the second duct for drawing said plate or link along in the slot and introducing the conductor in the first-named duct, substantially as described.

2. In an electrical subway, the combination of a duct or passage consisting of an iron pipe for the reception of insulated conductors, a second duct or passage consisting of an iron pipe removably fixed to the upper interior surface of the first-named duct by screws, a longitudinal slot or passage in the lower side of said second duct, a plate P, traveling in said slot, and a chain E for moving said plate along in said slot to introduce a conductor with respect to the first-named pipe, substantially as described.

3. The combination of two or more sections of underground conduit, each section being composed of two metal pipes of respectively different diameters, the smaller pipe fixed to the interior upper surface of the larger pipe, a longitudinal slot or passage in the lower side of the smaller pipe, a plate or link located in the said slot, a device for drawing said plate or link along, located within the smaller pipe, a screw-thread on the exterior of the larger pipe, a screw-threaded coupling for uniting one section of conduit with another, a screw-threaded hole in the surface of said coupling, through which conductors may be led out, and a screw-threaded plug for closing said aperture or passage, substantially as described.

JOHN C. REILLY.

Witnesses:
V. E. SCHAUMBURG,
C. R. TRUEX.